INVENTOR.
ALBERT MACOVSKI
BY
[signature]
ATTORNEY

Nov. 15, 1960 A. MACOVSKI 2,960,562

COLOR TELEVISION SYNCHRONOUS DETECTORS

Filed April 26, 1954 3 Sheets-Sheet 2

INVENTOR.
ALBERT MACOVSKI
BY
[signature]
ATTORNEY

Nov. 15, 1960 A. MACOVSKI 2,960,562

COLOR TELEVISION SYNCHRONOUS DETECTORS

Filed April 26, 1954 3 Sheets-Sheet 3

INVENTOR.

ALBERT MACOVSKI

BY

[signature]

ATTORNEY

United States Patent Office 2,960,562
Patented Nov. 15, 1960

2,960,562

COLOR TELEVISION SYNCHRONOUS DETECTORS

Albert Macovski, Massapequa, N.Y., assignor to Radio Corporation of America, a corporation of Delaware Filed Apr. 26, 1954, Ser. No. 425,479

19 Claims. (Cl. 178—5.4)

The present invention relates to improved methods and apparatus for providing synchronous detection of a signal and more particularly to methods and apparatus for synchronous detection in a color television receiver.

A color television signal conforming to standards adapted by the Federal Communications Commission on December 17, 1953 includes both luminance and color information signals. If three primary colors are mixed together in the right proportions to produce a white matching typical daylight, it is found that the green primary color which is located at the center of the visible spectrum accounts for 59 percent of the brightness sensation, while the red and blue primary colors account for only 30 percent and 11 percent respectively. Therefore, a luminance signal is produced from the camera tube system which produces a brightness or Y signal equal to $$Y=.30R+.59G+.11B \qquad (1)$$

This signal should be generated in accordance with existing standards, and be treated exactly like a standard monochrome signal with respect to bandwith and the addition of synchronizing and blanking pulses.

Consider now the fundamental nature of the color signals. If a brightness or luminance signal is transmitted according to the relationship observed in Equation 1, then the red, green, and blue signals required for the color kinescope may be provided by transmitting what are referred to as chrominance or color difference signals namely $R-Y$, $G-Y$, and $B-Y$. When considered in combination they indicate how each color in the televised scene differs from a monochrome color of the same luminance. However, it can be shown that these three chrominance signals are not independent, therefore when any two of them are known it is possible to solve for a third. For example if, as follows from Equation 1

$$R-Y=.70R-.59G-.11B \qquad (2)$$

$$B-Y=-.30R-.59G+.89B \qquad (3)$$

then it can be shown that the green color-difference signal can be formed by utilizing the following relationship $$G-Y=-.51\ (R-Y)-.18\ (B-Y) \qquad (4)$$

Thus if two color-difference signals, say those described by Equations 2 and 3 are transmitted along with the luminance signal, the third color-difference signal can be recovered by the use of the relationship given by Equation 4 and a color television image can be reconstructed in a receiver by proper use of these color-difference signals and the luminance signal. Two other signals bearing color information are often employed in the transmission, namely I and Q color-difference signals; the I signal representing color information along an orange-cyan axis and the Q signal representing substantially green-purple information. The $R-Y$, $B-Y$, and $G-Y$ color-difference signals can easily be recovered from these I and Q color-difference signals, once these signals themselves have been demodulated, or can be recovered directly from the signal means which is utilized or transmit the I and Q color-difference signals.

The color-difference signal information may be transmitted on a color subcarrier. The color subcarrier frequency is chosen at 3.579 mc. At the receiver the information contained in the color subcarrier can be recovered by synchronous detection; that is, the mixing of the color subcarrier with a locally generated subcarrier signal of proper phase. The locally generated subcarrier signal must be accurately synchronized with the transmitter, so a synchronizing burst of at least 8 cycles of subcarrier frequency at a proper phase with respect to the two component color signals is included in the color television signal.

The present invention therefore deals with the synchronous detection of color information which is included in the color subcarrier. Synchronous detection is one of the more important functions which is required of a color television receiver, and the present invention will be seen to be uniquely suited for performing this function in a highly efficient and reliable fashion.

It is, therefore, one object of this invention to provide an improved means of synchronous detection.

It is still another object of this invention to provide an efficient means of extracting signal information from a modulated subcarrier.

It is yet another object of this invention to provide an improved method of extracting a color signal from a color television signal in a color television receiver.

It is yet another object of this invention to provide an improved method for the synchronous detection of color information in a color television receiver.

It is a further object of this invention to provide a method of synchronous detection for a color television signal containing both luminance information and a color subcarrier containing chrominance information whereby the chrominance or color-difference signal information is obtained from the color subcarrier and combined with the luminance signal to yield the original component color signal.

It is a still further object of this invention to provide a simplified means of extracting a component color signal directly from a composite color television signal.

According to a theory of operation of this invention, if a carrier, modulated by a modulating signal is passed through a time varying impedance and if this time varying impedance has at least a harmonic component of impedance corresponding to the frequency and phase relationship of the carrier, the modulating signal may be caused to be developed across the time varying impedance.

According to this invention, a two-angle modulated color television signal to be demodulated is applied across an impedance such as the cathode-anode path of a vacuum tube. The impedance presented to the color signal is varied at a rate corresponding to the frequency of the carrier of the signal to be demodulated. This may be done by applying a demodulating oscillation having the frequency of the carrier to a grid of the vacuum tube to render the tube conductive for short intervals corresponding in time to the desired phase of the color signal to be demodulated. When the vacuum tube is conductive, a finite impedance is presented by the tube to the color signal and the desired demodulated signal is obtained across the tube. When the vacuum tube is cut off, a substantially infinite impedance is presented to the color signal, and no demodulated signal is generated.

In one form of this invention a color subcarrier containing chrominance information is applied to a grid controlled device whose impedance varies at a rate which is that prescribed for synchronous detection of the particular chrominance information signal in the color subcarrier. This time varying grid controlled impedance will cause synchronous detection of the chrominance information from the color subcarrier; if the luminance signal is also applied to the time varying grid controlled impedance, the demodulated color difference information will be added to this luminance information to yield directly the component primary color information.

Other objects and advantages of the present invention will become apparent upon a reading of the following specification and an inspection of the accompanying drawings in which:

Figure 1 is a vector diagram which describes the phase relationships between the various color signals which are utilized in color television transmission;

Figure 2*a* shows the luminance frequency range;

Figure 2*b* shows the Q frequency range;

Figure 2*c* shows the I frequency range;

Figures 1, 2, 3:
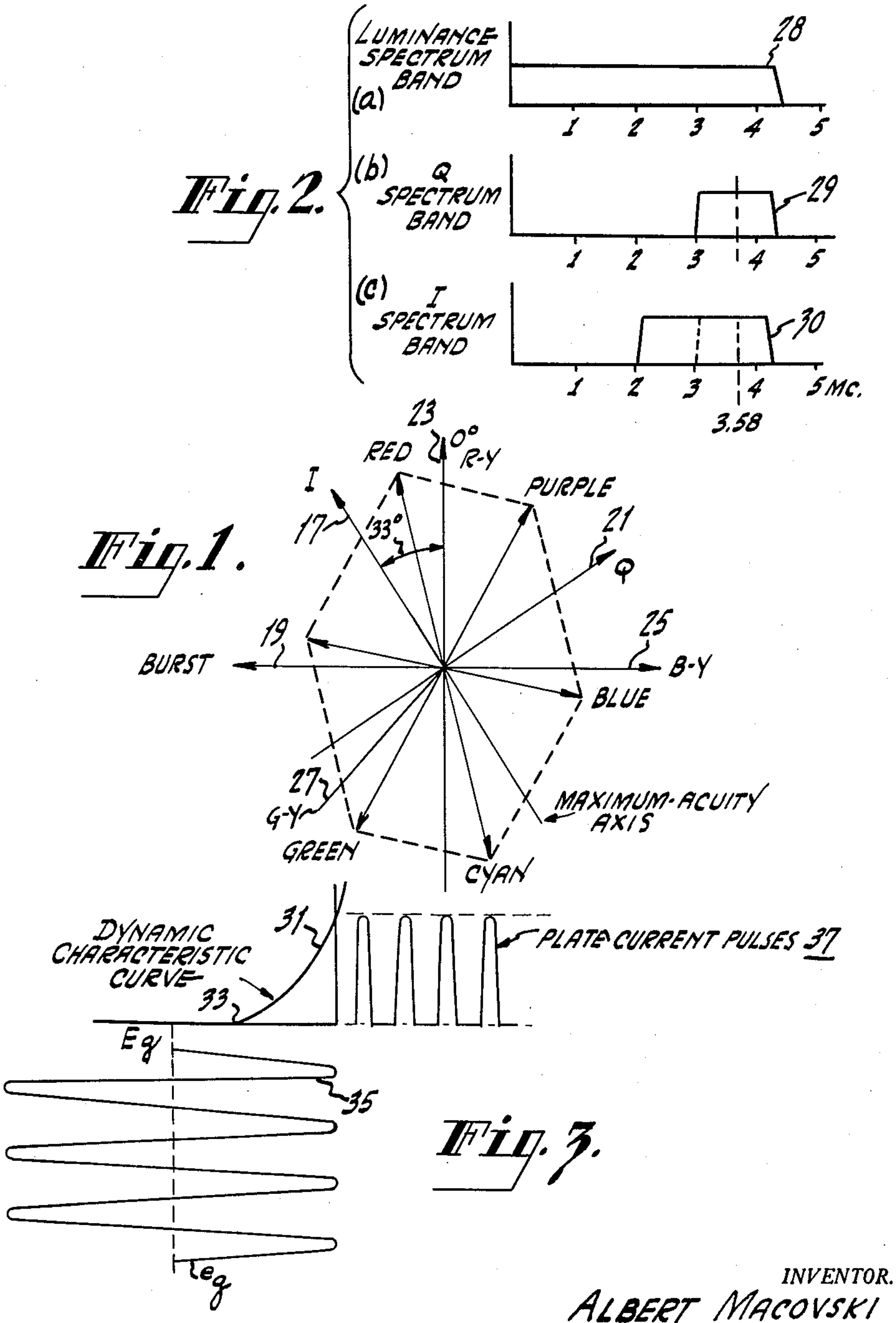
Figure 3 shows the fundamentals of basic class C amplifier operation.

The present invention is an improved circuit and simplified method for the synchronous detection of signal information which has been included in a modulated carrier or subcarrier signal. In many circuits hitherto used, synchronous detection has been accomplished by using a multigrid electron tube in which the information carrying subcarrier is impressed on one of the several control grids and the local oscillator signal of suitable phase is impressed on another of the control grids. By this arrangement, multiplication and therefore heterodyning takes place within the electron tube to yield the recovered modulating information in an output circuit. It is to be noted, however, that this process is relatively inefficient. The present invention, as will be demonstrated, represents not only an increase in the efficiency of the process of synchronous detection but also a technique which is more reliable and less complicated.

In one of the broader concepts associated with the present invention the subcarrier signal containing the information to be demodulated by synchronous detection is passed through an impedance which varies at a frequency and phase related to the information to be detected. Generally the operation of such a circuit may be demonstrated by the following development where A and B represent two currents which vary independently with time and $\omega_c$ represents the carrier or subcarrier frequency; then the modulated subcarrier current may be expressed as $$i=A\cos\omega_c t+B\cos(\omega_c t+90°) \quad (5)$$

In order to recover the A component, let the entire signal (5) be passed through the time-varying resistance $R\cos\omega_c t$ in the synchronous demodulator to produce the voltage $$e=R[A\cos^2\omega_c t+B\cos(\omega_c t+90°)\cos\omega_c t] \quad (6)$$
$$=R[\tfrac{1}{2}A+\tfrac{1}{2}A\cos 2\omega_c t+\tfrac{1}{2}B\cos 90° +\tfrac{1}{2}B\cos(2\omega_c t+90°)] \quad (7)$$

Since the terms involving $2\omega_c$ may be filtered out and since $\cos 90°=0$, it follows that $$e=\tfrac{1}{2}AR \quad (8)$$

It is evident from Equation 8 that the A component has been recovered independently of the B component which does not develop a voltage of significant magnitude across the time varying resistance and therefore has not been demodulated.

Consider now the vector diagram shown in Figure 1. This vector diagram illustrates the nature of the color-difference signal information included in the color subcarrier. Each color-difference signal is represented by a vector; the $R-Y$ color-difference signal, for example, is represented by vector 23. The phase angle of a vector gives a good indication of hue while the vector amplitude when considered along with the corresponding luminance level gives an indication of saturation. White or neutral colors fall at the center of the diagram since these produce no subcarrier component. The eye has greatest acuity for color-differences corresponding to the axis displaced from the $R-Y$ axes 23 by 33°. The maximum acuity axis 17 is an orange-cyan axis. The I signal corresponds to the maximum acuity orange-cyan axis 17 while the Q component corresponds to the axis at right angles to this axis 17 or the axis 21. The adoption of these axes produces no great problems when it comes to signal transmission since it can be shown that I and Q can be explained in terms of the red, blue and color-difference signals by the equations $$I=.74\,(R-Y)-.27\,(B-Y) \quad (9)$$
$$Q=.48\,(R-Y)+.41\,(B-Y) \quad (10)$$

It is also possible to solve the equations relating the I and Q signals and the red and blue color-difference signals to show how the red and blue color-difference signals can be reconstructed by appropriate values of the I and Q signals, namely $$R-Y=\ .96I+.62Q \quad (11)$$
$$B-Y=-1.10I+1.70Q \quad (12)$$

The green color-difference signal can be recovered by cross mixing I and Q signals directly according to the equation $$G-Y=-.28I-.64Q \quad (13)$$

Consider now the problems attendent with the transmission of the I and Q signals on a color subcarrier having a frequency of 3.579 mc. Figure 2*a* illustrates the frequency range of a picture signal; this frequency range is approximately 4.1 mc. wide. It follows then that if the color subcarrier having a frequency of 3.58 mc. is to be modulated to produce double sidebands, the region available for double sidebands extends only about ½ mc. above the frequency of the color subcarrier. This places an upper limit on the side frequency energy though not a lower limit on the side frequency energy since a region down to around 2 mc. is available for the lower side frequencies. Below 2 mc. these side frequencies would interfere with the luminance signal and would also involve certain filtering problems.

The Q component is a signal which is principally along the axis 21 and does not play an important part in edge resolution, it is assigned the frequency bandwidth 29 as shown in Figure 2*b*, with an upper limit of approximately ½ mc. in either direction from the color subcarrier frequency. The I component is the orange-cyan axis component which is used to supply edge definition information. Since the color television signal cannot have color information above 4.1 mc., the I signal, as shown in Figure 2*c*, develops a double sideband signal range using for color components up to ½ mc. and a single sideband signal range from color components from approximately ½ mc. to 1½ mc. as shown by the frequency bandwidth 30.

Before turning to the color television receiver circuitry which employs the present invention, consider first the behavior of an electron tube which has a dynamic characteristic curve 31 such as that shown in Figure 3. Let a grid voltage 35 which is biased beyond the cut off point 33 of the dynamic characteristic curve 31 be applied to the electron tube with the cut off voltage and the peakdenser 105 and resistor 107, to the anode 117 of the electron tube 115. Since the terminal 101 is referenced to ground, the composite signal is applied across the cathode-anode path of the tube 115.

The composite signal is coupled between the anode 117 and the cathode 118 by way of the resistance-condenser circuit 106. This composite signal, as will be recalled, contains both the luminance signal and the color subcarrier which includes components representative of the color-difference information. With the signal from the phase splitter 73 applied to the terminal 103, and with the phase of this signal adjusted to that phase corresponding to the $R-Y$ color-difference signal in the color subcarrier, this phase lagging the burst phase by 90° in one form of color television system, synchronous detection of the $R-Y$ color-difference signal takes place wtih the $R-Y$ color-difference signal developed at the terminal 113. But since the electron tube 115 presents an impedance to the luminance information, the luminance signal also appears at terminal 113, the potential of this terminal being referred to ground. With the luminance signal and the color-difference signal appearing at the same terminal the result is the direct addition of the luminance signal and the color difference signal and thus the development of the primary color signal itself at this point. Note that the color subcarrier information relating to the other color-difference signals passes through the electron tube 115 without developing a significant voltage across this tube and therefore is not included in the information delivered to the terminal 113. This red information may then be fed either directly to the corresponding control grid of the color kinescope 63 or through a filter circuit 77 having the characteristic curve like that shown in 87 from which it is fed to the corresponding control grid of the color kinescope 63. The green and blue signal demodulator circuits are identical to the red signal circuit shown in Figure 5 and operate similarly for their respective color signals.

Figures 4, 5:
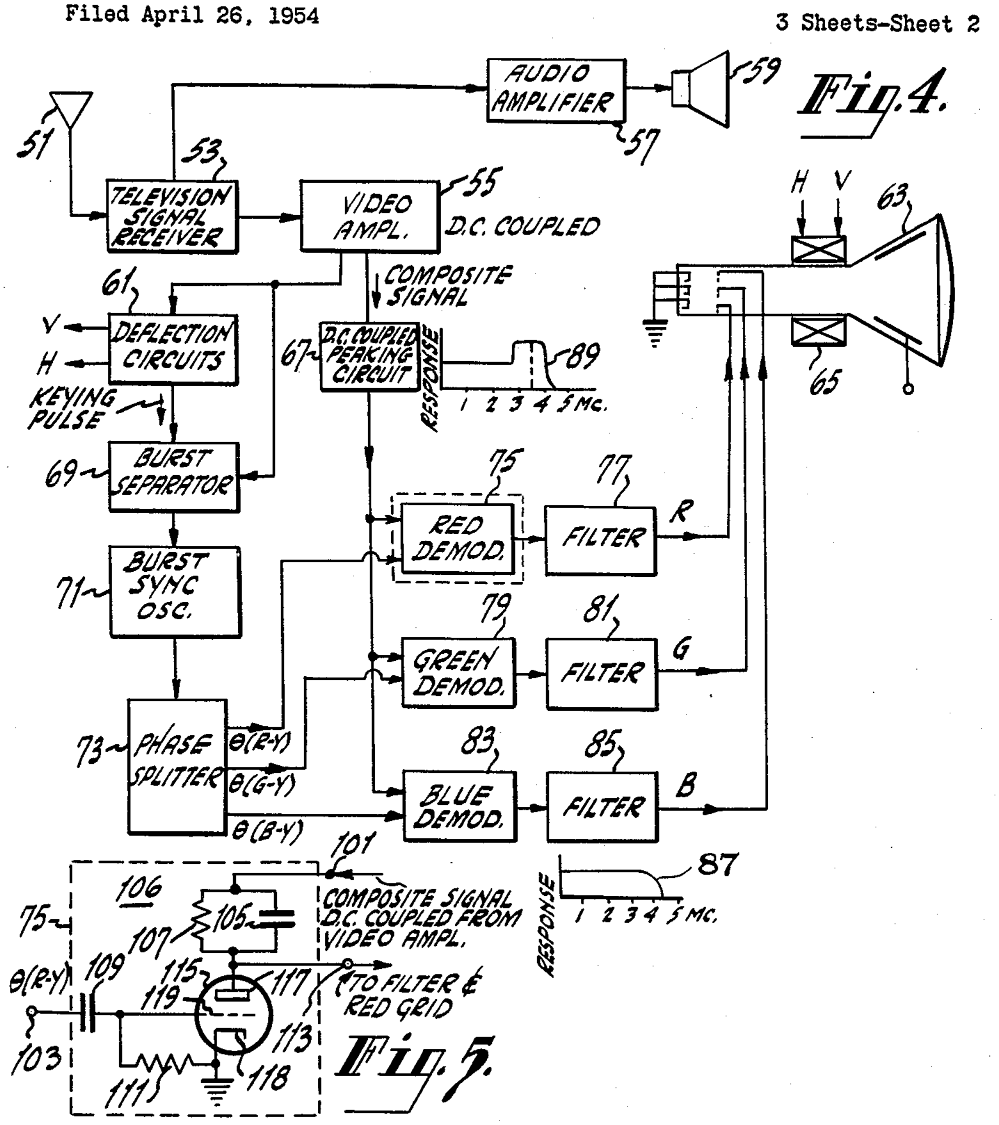
Figure 4 shows a color television receiver circuit which employs the present invention.
Figure 5 shows one circuit embodying the present invention.

One feature of the use of the circuit illustrated in Figure 4 is that the composite signal may be directly D.-C. coupled from the video amplifier, so that it retains its D.-C. information. In such case, D.-C. restorers are not necessary and the signal from 113 can be applied to the kinescope grid or through a suitable circuit for the elimination of color crawl or circuits designed for smoothing, to yield a recovered color television picture.

Figure 6:
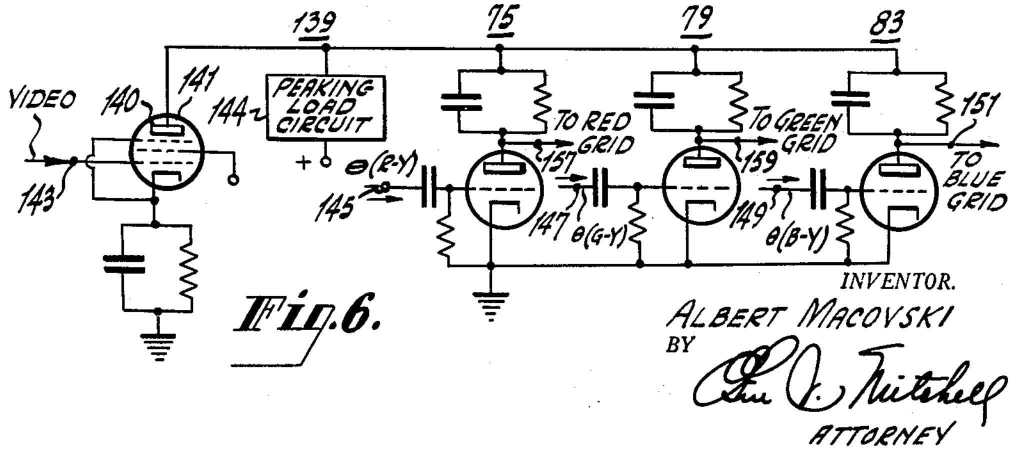
Figure 6 shows how the present invention may be utilized to produce a red, a green, and a blue signal which can be applied directly to the color kinescope.

Figure 6 shows a circuit diagram according to the present invention including three synchronous detectors based on the circuit shown in Figure 5. The composite signal from the video amplifier 139 is passed from the anode 140 to the red demodulator 75, the green demodulator 79, and the blue demodulator 83. The anodes of the various demodulators are D.-C. coupled to the final video amplifier 139. Red, green, and blue signals, as made up from the combination of the luminance signal with the $R-Y$, the $G-Y$ and $B-Y$ signals, respectively, are developed at the terminals 157, 159 and 161.

Figures 7, 8:
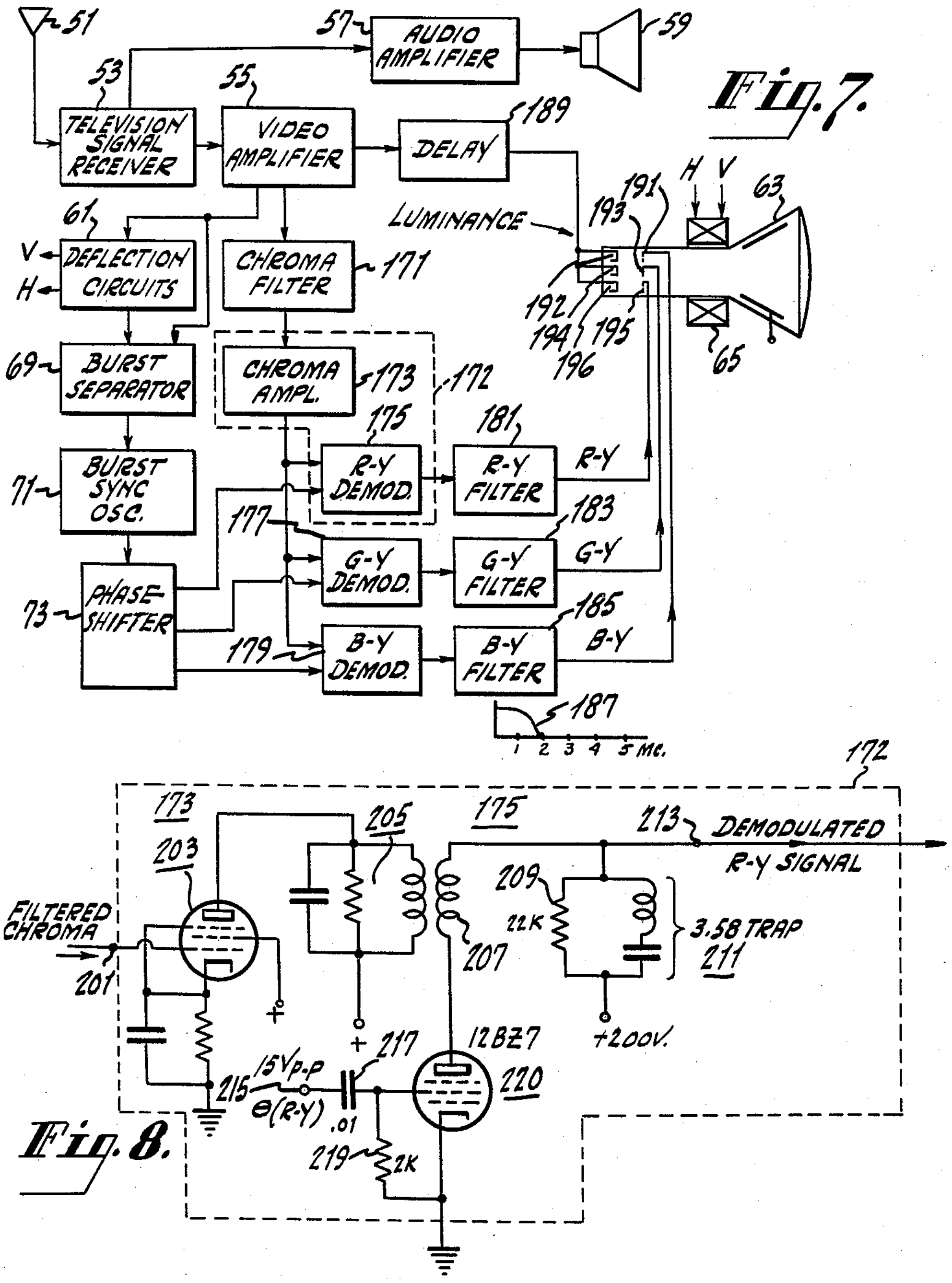
Figure 7 shows a block diagram of a color television receiver which utilizes another version of the present invention.
Figure 8 shows a circuit detail of a portion of Figure 7.

Figure 7 shows one circuit wherein color-difference signals are demodulated independently and then impressed on the color kinescope 63 with an independently supplied luminance signal. The operation of the color television circuit shown in Figure 7 with respect to burst synchronization, video amplification, circuits and the television signal receiver is identical to the circuit of Figure 4. However, in Figure 7 the luminance signal is shown to issue from the video amplifier 55 and to be impressed through the suitable delay line 189 directly on the cathodes 192, 194 and 196 which are included in the red, blue, and green information electron guns, respectively. The composite signal is then passed through the chroma filter 171 which removes all signal components outside of the frequency band from substantially 2 to 4.1 mc. The resulting chroma information which has thereby been substantially separated from the luminance information is passed through a chroma amplifier 173 after which it is impressed simultaneously on the $R-Y$ demodulator 175, the $G-Y$ demodulator 177, and the $B-Y$ demodulator 179. These demodulators yield the $R-Y$, $G-Y$ and $B-Y$ color-difference signals which are then passed through their respective filters 181, 183 and 185 to the control grids 195, 193 and 191 respectively of the color kinescope 63. By adoption of suitable polarities of both the luminance signal and the color-difference signals applied to the color kinescope 63, addition of the luminance signal and each color-difference signal takes place to reproduce the television image on the face of the color kinescope 63. By channelling the luminance signal and the color-difference signals through different circuits, it is evident that the Y or luminance signal can be given any desired amplification to compensate for any loss of color-difference signal information during synchronous detection.

In the circuit diagram shown in Figure 8, the filtered chroma information in the form of the color subcarrier is applied directly to the grid terminal 201 of the chroma amplifier 203 whose output appears across the tuned circuit 205. By connecting together the synchronous demodulator tube 220, the coupling coil 207, the load resistor 209, and the 3.58 megacycle trap 211, the demodulated $R-Y$ signal will be developed at the terminal 213. This $R-Y$ signal is then filtered by the $R-Y$ filter 181 in Figure 7 and then applied to the grid 195 of the color kinescope 163.

It can be seen that the chroma signal is applied across the demodulator tube 220, and a demodulating oscillation at the $R-Y$ phase is applied to a grid of the tube. The tube is biased to be conductive for short intervals corresponding in time with the $R-Y$ phase of the chroma signal. When the tube is conductive, a substantial impedance is presented to the chroma signal, and a demodulated $R-Y$ signal is developed across this impedance. When the tube is cut off, a substantially infinite impedance, or open circuit, is presented to the chroma signal, and no demodulated signal appears. Therefore, a demodulated $R-Y$ signal is developed at terminal 213 by employing the demodulator tube 220 to present a finite impedance to the chroma signal solely at those instants when the $R-Y$ signal is present in the chroma signal.

It has been found that a circuit which has been constructed and operated utilizing a 12BZ7 tube and a 22 K. resistance, with the chrominance signal applied to the plate of the synchronous detector 220, the efficiency of the synchronous detector is approximately 80 percent. Approximately 15 volts peak-to-peak of locally generated oscillator signal is applied to the grid terminal 215 in Figure 8 with the magnitude of the condenser 217 and the resistance 219 set at .01 $\mu$f. and 2,000 ohms respectively. The demodulated color-difference signal output of the circuit shown in Figure 8 has more than sufficient output to drive the kinescope in the arrangement described where the color-difference signals are applied to the grids and the luminance signal is applied to the cathodes. Up to 200 volts peak-to-peak of the color-difference signals with adequate linearity has been obtained. The present invention has heretofore in the specification been described in terms of its application to the synchronous detection of $R-Y$, $B-Y$, and $G-Y$ color-difference signals. The present invention, and in particular the circuit shown in Figure 8, can also be successfully used for synchronous detection of the I and Q signals which can then be recombined in a suitable matrix and adder circuit with the luminance signal to yield the component red, green, and blue color signal.

Having described the invention, what is claimed is:

1. In a signalling system for the transmission and demodulation of a carrier having a prescribed frequency and modulated by a modulating signal at a phase of said carrier relative to a reference phase, synchronous deto-peak voltage of the grid voltage being such that the electron tube conducts current for less than ½ cycle as shown in Figure 3. The result is that a series of plate current pulses 37 are produced by the electron tube; these plate current pulses will flow through the output circuit whose characteristic are already implicitly included in the shape of the dynamic characteristic curve 31.

Since the plate current pulses 37, shown in Figure 3 represent a complex waveform, then these pulses can be represented by the Fourier series $$i_p=\sum_{n=0}^{\infty}I_n \cos n\omega_c t \qquad (14)$$

where $\omega_c$ is the angular frequency of the alternating grid voltage and $I_n$ represent the magnitude of each Fourier component of current with $I_0$ denoting the average current, $I_1$ denoting the fundamental component, $I_2$ denoting the second harmonic, and so on. It is well known that, for current pulses 37 of the type illustrated in Figure 3, the principal harmonic component is the first harmonic or fundamental with the second harmonic being of reduced size depending actually on the duration time of the current pulses. Should the current pulses have progressively less duration time per cycle, then the higher Fourier components beyond the fundamental will become increasingly important. For a very detailed analysis and discussion of the Fourier components involved with the production of plate current pulses 37 of the type illustrated in Figure 3 see, for example, pages 136 to 138 of the book "Harmonics, Sidebands and Transients in Communication Engineering" by C. Louis Cuccia published by the McGraw-Hill Book Co. in 1952.

When an electron tube is excited so that the alternating current voltage operates on a substantially linear portion of the dynamic characteristic curve 31, then the electron tube will present a substantially constant impedance to the circuit into which it is incorporated. However, when the electron tube develops plate current pulses such as those shown in Figure 3, then the electron tube becomes a nonlinear impedance with its impedance a time-varying function of the grid drive and also the extent to which the tube is cut off during a cycle of operation. Since the plate current is passed for only a portion of each cycle of the grid drive, the electron tube functions class B or class C depending on the duration interval of each plate current pulse.

The preceeding discussion related to Figure 3 has been predicated upon the existence of a constant plate potential applied to the electron tube. Should an alternating current component be included in the plate potential of the electron tube then the precise form of the plate current pulses will change. The electron tube will exhibit a periodically varying component of impedance to the impressed anode voltage with the period of this variation being determined by the driving grid voltage 35. When a signal, such as a color subcarrier, is impressed on the anode of the electron tube and when the grid driving voltage 35 is a wave of frequency identical to that of the subcarrier and with a phase related to phase and amplitude modulations in the subcarrier corresponding to a modulating wave, then synchronous detection will take place with the modulating wave contained in the subcarrier at that phase developed across the electron tube.

Consider now the color television receiver circuit shown in Figure 4, which is one embodiment of the present invention. In this circuit the color television signal from the transmitter arrives at the antenna 51 and is impressed on the television signal receiver 53 which performs the functions of radio frequency amplification, first detection, intermediate frequency amplification and second detection. The processes of television signal reception and demodulation are well known and for an illuminating account of the operation of a television receiver see, for example, Antony Wright "Television Receivers" in the March 1947 issue of the RCA Review. The recovered television signal is then passed to the video amplifier 55.

The television signal contains sound information in addition to color and video information. The sound can be transmitted with the picture information by the well known principle of intercarrier sound. Audio information is recovered and sent to the audio amplifier 57 from whence it is impressed upon the loud speaker 59.

The luminance information and the color information are contained in a composite signal present in the video amplifier. This composite signal is applied to the D.-C. coupled peaking circuit 67 which has a response curve 89 peaked near the color subcarrier from the peaking circuit, the composite signal is applied directly to the red demodulator 75, the green demodulator 79 and the blue demodulator 83. These demodulators are each synchronous detectors which require the application of accurately phased locally generated signals having the frequency of the color subcarrier and phases related to the phases of the color-difference signals to be synchronously demodulated or detected. The locally generated signals may be obtained from the burst synchronizing oscillator 71 which passes an output signal into the phase splitter 73 which separates the signal into three phases, one phased for red color-difference signal synchronous detection, one signal phased for green color-difference signal synchronous detection and one signal for blue color-difference signal synchronous detection. The burst synchronizing oscillator 71, in order to produce three properly phased signals from the phase splitter 73 is very accurately synchronized with the phase of the subcarrier at the transmitter. This is accomplished by utilizing the color synchronizing burst which is contained in the incoming color television signal in the following manner.

The composite color television signal from the video amplifier 55 is applied directly to the burst separator 69. At the same time the same signal is applied to the deflection circuits 61 which not only develops suitable deflecting signals for the deflection yokes 65, but also a keying voltage which is applied to the burst separator 69 which separates the color synchronizing burst from the color television signal. The separated burst is then fed into the burst synchronizing oscillator 71 which may be any one of a number of conventional types and may employ signal injection, ringing circuits, or reactance tube-phase detector controlled oscillators.

Once the red, green, and blue primary color television signals have been recovered by the red demodulator 75, the green demodulator 79 and the blue demodulator 83, respectively, the red signal may be passed through filter circuit 77, the green signal through filter circuit 81, and the blue signal through filter circuit 85, each filter circuit having a response curve similar to that shown by the curve 87 which suppresses to a great extent color subcarrier frequency thereby reducing the tendencies toward color crawl and associated dot structure in the reproduced image.

Consider now Figure 5 which shows the circuit for the red demodulator 75. The locally generated demodulating signal having an $R-Y$ phase is applied to the terminal 103. This signal is passed through the condenser 109 to the grid 119 of the electron tube 115. Since the terminal 103 is referenced to ground, the demodulating signal is applied across the cathode 113 and grid 119 electrodes of tube 115. A resistance 111 is connected between the grid 119 and the cathode 113. The condenser 109 and the resistance 111 respond to rectification and clipping of the $R-Y$ signal by the grid 119 and the cathode 113 to develop a negative bias at the grid 119 relative to the potential of the cathode 113; this negative bias at the grid 119 causes class C operation of the electron tube 115. The composite signal is passed directly from the video amplifier to the terminal 101 through the resistance-condenser network, made up of the contector means for the synchronous detection of said modulating signal comprising in combination, a local signal source for producing a local signal having said prescribed frequency and said phase, a class C operated amplifier device having an input electrode, an output electrode and a common electrode, means to bias said amplifier device to operate class C in response to the application of said local signal to said input electrode, and means for coupling said carrier across the output electrode-common electrode current path of said class C operated amplifier device to cause said modulating signal to be developed across said class C operated amplifier device.

2. In a signalling system for the transmission of a subcarrier having a prescribed frequency and modulated by a modulating signal at a phase of said carrier related to a reference phase, synchronous detector means for the synchronous detection of said modulating signal comprising in combination, a local signal source for producing a local signal having said prescribed frequency and said phase, an electron flow device having an anode, a cathode, an output circuit coupled to said anode, and at least an electron flow control electrode, means for coupling said local signal to said control electrode to produce a flow of current in said electron flow device during a prescribed portion of a cycle of oscillation of said local signal, and means for coupling said subcarrier across the anode-cathode path of said electron flow device to produce said modulating signal in said output circuit.

3. In a color television receiver adapted to receive a color television signal including a modulated subcarrier having a prescribed frequency and modulated by a plurality of color modulating signals, each of said color modulating signals corresponding to a phase of said subcarrier, means for the synchronous detection of each of said color modulating signals comprising in combination, an electron tube having an output circuit, an anode, a cathode, and at least a control grid, a local signal source developing a local signal at said prescribed frequency and at a selected phase, means for coupling said local signal between the control grid and cathode of said electron tube to provide class C operation of said electron tube, and means for applying said modulated subcarrier signal between the anode and cathode of said electron tube to modulate the electron flow of said electron tube to cause the color modulation signal corresponding to said selected phase to be developed in the output circuit of said electron tube.

4. In a color television receiver adapted to receive a color television signal including synchronizing bursts, a luminance signal and a modulated subcarrier having the frequency of said bursts, said subcarrier being modulated by a plurality of color-difference signals, each of said color-difference signals corresponding to a predetermined phase of said modulated subcarrier, the combination of, a plurality of amplifier tubes each including at least a cathode, a control grid, and an anode, means to translate said received synchronizing bursts into a continuous demodulating oscillation having the same frequency as said subcarrier, means to derive a plurality of phases of said demodulating oscillations and to couple said phases across the cathode and control grid electrodes of respective ones of said amplifier tubes, said amplifier tubes being biased for class C operation, means for applying said subcarrier between the cathode and anode electrodes of all of said amplifier tubes, and a plurality of output circuits each coupled to the anode of a respective one of said amplifier tubes to provide a corresponding plurality of synchronously detected color-difference signals.

5. In a color television receiver adapted to receive a color television signal including a synchronizing burst, a luminance signal, and a modulated subcarrier of prescribed frequency containing a plurality of color-difference signals, each of said color-difference signals corresponding to a phase of said modulated subcarrier, means for synchronous demodulation of each of said plurality of color-difference signals, comprising in combination, a plurality of synchronous detectors, one of said three synchronous detectors for each of said color-difference signals, each of said synchronous detectors consisting of an electron flow device including an electron flow control electrode and presenting an electron flow path between a pair of additional electrodes, said path being adapted to be alternately conducting and nonconducting subject to the frequency and magnitude of a control signal impressed on said control electrode, a burst synchonized local signal source producing a signal at said prescribed frequency, phase shifting means for separating the output of said burst synchronized local oscillator into selected phases, each of said selected phases corresponding to one of said color-difference signals, means for applying said selected phases to the control electrodes of respective ones of said electron flow devices, means for applying said modulated subcarrier across the electron flow paths of all of said electron flow devices, and an output circuit coupled to each of said electron flow devices to provide corresponding demodulated color-difference signals.

6. In a color television system, a source of a chrominance signal consisting of a color subcarrier which is modulated in amplitude and phase with color information, a source of demodulating reference oscillations having the same frequency as said color subcarrier and having a predetermined phase relative to said subcarrier, a vacuum tube having at least a cathode, a control grid and an anode, means to couple said source of reference oscillations between said control grid and said cathode, means to bias said vacuum tube for class C operation, means to couple said chrominance signal source between said anode and said cathode, and means to derive a demodulated color information signal from said anode.

7. In a color television system, a source of a chrominance signal consisting of a color subcarrier which is modulated in amplitude and phase with color information, a source of demodulating reference oscillations having the same frequency as said color subcarrier and having a predetermined phase relative to said subcarrier, an amplifying device having an input electrode, an output electrode and a common electrode, means to couple said source of reference oscillations between said input electrode and said common electrode, means to couple said chrominance signal source between said output electrode and said common electrode, and means to derive a demodulated color information signal from said output electrode.

8. In a color television receiver, a source of a chrominance signal consisting of a color subcarrier which is modulated in amplitude and phase with color information, a source of demodulating reference oscillations having the same frequency as said color subcarrier and having a predetermined phase relative to said subcarrier, a vacuum tube having at least a cathode, a control grid and an anode, means to couple said source of reference oscillations between said control grid and said cathode, means to couple said chrominance signal source between said anode and said cathode, and means to derive a demodulater color information signal from said anode, said last named means including trap means to remove said color subcarrier frequency.

9. In a color television receiver or the like, a source of a chrominance signal consisting of a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations to said control electrode, means to couple said chrominance signal source between said output electrode and said common electrode, means to bias said electrodes so that said amplifying device is rendered alternately on and off by said reference oscillations, whereby the impedance existing between the common electrode and the output electrode of said amplifying device is an impedance which varies at the rate of said reference oscillations, and means to derive a demodulated color-difference signal from said output electrode.

10. In a color television receiver, a source of a chrominance signal consisting of a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations to said control electrode, means to couple said chrominance signal source between said output electrode and said common electrode, means to bias said electrodes so that said amplifying device is rendered alternately on and off by said reference oscillations, whereby a finite impedance is presented to said chrominance signal when said amplifying device is on, and means to derive a domedulated color-difference signal from said output electrode, said last named means including a trap to remove said reference oscillations.

11. In a color television receiver, a source of a chrominance signal consisting of a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations across said control electrode and said common electrode, means to couple said chrominance signal source across the electrode-common electrode path of said amplifying device, means to bias said electrodes so that said amplifying device is rendered alternately on and off by said reference oscillations, and means to derive a demodulated color-difference signal from said output electrode, said last named means including a trap to remove said reference oscillations.

12. In a color television receiver, a source of a composite video signal consisting of a luminance signal and a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations to said control electrode, means to couple said composite video signal source between said output electrode and said common electrode, means to bias said electrodes so that said amplifying device is rendered alternately on and off by said reference oscillations, whereby the impedance existing between the common electrode and the output electrode of said amplifying device is an impedance which varies at the rate of said reference oscillations, and means to derive a combined luminance and color-difference signal from said output electrode, said last named means including a trap to remove said reference oscillations.

13. In a color television receiver, a source of a composite video signal consisting of a luminance signal and a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations to said control electrode, means to couple said composite video signal across the output electrode-common electrode path of said amplifying device, means to bias said electrodes so that said amplifying device is rendered alternately on and off by said reference oscillations, whereby a load impedance is presented to said video signal at a predetermined phase of said modulated color subcarrier, and means to derive a combined luminance and color-difference signal from said output electrode, said last named means including a trap to remove said reference oscillations.

14. In a color television receiver, a source of a chrominance signal consisting of a color subcarrier which is modulated in amplitude and phase with color information, a source of demodulating reference oscillations having the same frequency as said color subcarrier and having a predetermined phase relative to said color subcarrier, an amplifying device having at least a common electrode, a control electrode and an output electrode, means to couple said source of reference oscillations to said control electrode, means to couple said chrominance signal across the output electrode-common electrode path of said amplifying device, whereby the impedance existing between the common electrode and the output electrode of said amplifying device and presented to said composite video signal is an impedance which varies at the rate of said reference oscillations, and means to derive a demodulated color-difference signal from said output electrode, said last named means including a trap to remove said reference oscillations.

15. In a color television receiver, a source of a chrominance signal consisting of a color subcarrier which is modulated in amplitude and phase with color information, a source of a plurality of demodulating reference oscillations all having the same frequency as said color subcarrier and each having a different predetermined phase relative to said color subcarrier, a plurality of amplifying devices each having at least a common electrode, a control electrode and an output electrode, means to couple said sources of reference oscillations to control electrodes of respective ones of said amplifying devices, means to couple said source of chrominance signal across the output electrode-common electrode paths of all of said amplifying devices, and means to derive a respective demodulated color-difference signal from the output electrode of each of said amplifier devices.

16. In a color television receiver, a source of a crominance signal consisting of a color subcarrier which is modulated in amplitude and phase with color information, a source of two demodulating reference oscillations both having the same frequency as said color subcarrier and each having a different predetermined phase relative to said color subcarrier, two amplifying devices each having at least a common electrode, a control electrode and an output electrode, means to couple said two sources of reference oscillations to control electrodes of respective ones of said amplifying devices, means to couple said source of chrominance signal between the output electrode and common electrode of both of said amplifying devices, and means to derive a different color-difference signal from the output electrode of each of said amplifier devices.

17. In a color television receiver, a source of a composite video signal consisting of a color subcarrier which is modulated in amplitude and phase with color information, a source of a plurality of demodulating reference oscillations all having the same frequency as said color subcarrier and each having a different predetermined phase relative to said color subcarrier, a plurality of amplifying devices each having at least a common electrode, a control electrode and an output electrode, means to couple said plurality of reference oscillations to control electrodes of respective ones of said amplifying devices, means to couple said composite video signal source across the output electrode-common electrode paths of all of said amplifying devices, and means to derive a combined luminance and respective color-difference signal from the output electrode of each of said amplifier devices.

18. In a color television receiver including a source of a chrominance signal and a source of reference oscillations, a color demodulator comprising, an amplifying device having at least a common electrode, a control electrode and an output electrode, an output circuit coupled to said output electrode, means to couple said source of reference oscillations to said control electrode, means to couple said chrominance signal source between said output electrode and said common electrode, and means to derive a demodulated color signal from said output circuit.

19. In a color television receiver including a source of a chrominance signal and a source of reference oscillations, a color demodulator comprising, an amplifying device having at least a common electrode, a control electrode and an output electrode, means to couple said source of reference oscillations to said control electrode, means to couple said chrominance signal source between said output electrode and said common electrode, and an output circuit coupled to said output electrode to provide a demodulated color-difference signal, said output circuit including means to suppress frequency components substantially equal to the frequency of said reference oscillations.

References Cited in the file of this patent

UNITED STATES PATENTS

| | | |
|---|---|---|
| 2,677,720 | Bedford | May 4, 1954 |
| 2,683,768 | Bliss | July 13, 1954 |
| 2,706,217 | Rhodes | Apr. 12, 1955 |
| 2,725,422 | Stark | Nov. 29, 1955 |
| 2,736,761 | Sziklai | Feb. 28, 1956 |
| 2,750,440 | Sziklai | June 12, 1956 |
| 2,752,417 | Pritchard | June 26, 1956 |
| 2,810,779 | Luck | Oct. 22, 1957 |
| 2,832,819 | Seely et al. | Apr. 29, 1958 |
| 2,877,294 | Hinsdale | Mar. 10, 1959 |

OTHER REFERENCES

A Simplified Receiver for the RCA Color Television System, February 1950, published by RCA, pages 3 to 6. (Copy in U.S. Patent Office Library.)